United States Patent
Singh et al.

(10) Patent No.: US 8,498,776 B2
(45) Date of Patent: Jul. 30, 2013

(54) FAULT DIAGNOSIS AND PROGNOSIS USING DIAGNOSTIC TROUBLE CODE MARKOV CHAINS

(75) Inventors: Satnam Singh, Bangalore (IN); Vineet R. Khare, Bangalore (IN); Rahul Chougule, Bangalore (IN)

(73) Assignee: GM Global Technology Operations LLC, Detroit, MI (US)

( * ) Notice: Subject to any disclaimer, the term of this patent is extended or adjusted under 35 U.S.C. 154(b) by 701 days.

(21) Appl. No.: 12/620,466

(22) Filed: Nov. 17, 2009

(65) Prior Publication Data

US 2011/0118932 A1    May 19, 2011

(51) Int. Cl.
*G01M 17/00*    (2006.01)
(52) U.S. Cl.
USPC ....... 701/33.4; 701/29.2; 701/29.9; 701/30.2; 701/31.8; 701/34.3; 340/438
(58) Field of Classification Search
USPC ............ 701/1, 2, 29.2, 29.9, 30.2, 31.8, 31.4, 701/34.3, 36, 37, 33.4; 714/26, E11.029; 706/12, 52; 340/438
See application file for complete search history.

(56) References Cited

U.S. PATENT DOCUMENTS

| | | | |
|---|---|---|---|
| 6,330,499 B1 * | 12/2001 | Chou et al. | 701/31.4 |
| 7,082,359 B2 * | 7/2006 | Breed | 701/36 |
| 7,421,321 B2 * | 9/2008 | Breed et al. | 701/33.6 |
| 2005/0065678 A1 * | 3/2005 | Smith et al. | 701/29 |
| 2006/0064291 A1 * | 3/2006 | Pattipatti et al. | 703/14 |

* cited by examiner

*Primary Examiner* — Gertrude Arthur Jeanglaude
(74) *Attorney, Agent, or Firm* — John A. Miller; Miller IP Group, PLC

(57) ABSTRACT

A system and method for fault diagnosis includes receiving information defining a relationship between failure modes and diagnostic trouble codes and extracting diagnostic trouble code data, including set times, frequency data and diagnostic trouble code sequence information for a plurality of diagnostic trouble codes relating to a plurality of failure modes. The system and method further include constructing a Markov chain using the diagnostic trouble code data for each of the plurality of failure modes, training the Markov chain to learn a set of state parameters using the diagnostic trouble code data, and computing a likelihood of a diagnostic trouble code sequence for each of the plurality of failure modes using the trained Markov chains.

20 Claims, 6 Drawing Sheets

| | $DTC_1$ | $DTC_2$ | $DTC_3$ | $DTC_4$ | $DTC_5$ | $DTC_6$ | $DTC_7$ | $DTC_8$ | $DTC_9$ | $DTC_{10}$ | $DTC_{11}$ | $DTC_{12}$ | $DTC_{13}$ |
|---|---|---|---|---|---|---|---|---|---|---|---|---|---|
| $FM_1$ | 1 | 1 | | | | | | | | | | | |
| $FM_2$ | 1 | 1 | | | | | | | | | | | |
| $FM_3$ | 1 | 1 | | 1 | | | | | | | | 1 | |
| $FM_4$ | 1 | | | 1 | | | 1 | 1 | 1 | 1 | 1 | | |
| $FM_5$ | 1 | | | 1 | | | | | 1 | 1 | 1 | | |
| $FM_6$ | 1 | | | | 1 | | | | 1 | 1 | 1 | | |
| $FM_7$ | | | | | | | | | | | 1 | | |
| $FM_8$ | | 1 | | | | | | | | | | | |
| $FM_9$ | | | 1 | | | | | | | | | | |
| $FM_{10}$ | 1 | | | | | 1 | | | | | | 1 | 1 |
| $FM_{11}$ | 1 | 1 | 1 | 1 | | 1 | 1 | 1 | 1 | 1 | 1 | 1 | 1 |
| $FM_{12}$ | 1 | 1 | 1 | 1 | 1 | 1 | 1 | 1 | 1 | 1 | 1 | 1 | 1 |

Symptoms (DTCs) / Failure Modes

FIG-2

FAULT DIAGNOSIS AND PROGNOSIS USING DIAGNOSTIC TROUBLE CODE MARKOV CHAINS

BACKGROUND

1. Field of the Invention

This invention relates generally to fault diagnosis and prognosis systems and, more particularly, to an improved method for fault diagnosis and prognosis using time-stamped diagnostic trouble codes (or fault codes) and Markov chains.

2. Discussion of the Related Art

There is a constant effort in the automotive industry to improve the quality and reliability of vehicles by incorporating fault diagnosis and prognosis features into vehicles. Traditionally, fault diagnosis is performed by a technician who connects a scan tool, or other diagnostic tool (e.g. TECH II™, MDI™), to the vehicle's electronic control unit (ECU). Once connected, diagnostic trouble codes (DTCs) are extracted from the ECU and used to determine what has caused the failure. In some cases, the DTCs alone are not enough to accurately determine the root cause of an issue because one DTC, or a combination of DTCs, can be symptoms for multiple failure modes. In addition, without any information as to when each DTC occurred, it is difficult to ascertain the true cause of a fault.

In recent years, vehicle fault diagnosis has improved with the implementation of on-board diagnostics, which are configured to automatically access vehicle DTCs to provide a vehicle operator or technician with diagnostic information without having to externally connect to the ECU. However, existing techniques are unable to distinguish between two failure modes that have the same DTC signature because they don't utilize the DTC firing time information in a systematic manner.

Therefore, what is needed is a system and method configured to: 1) utilize set time and frequency of DTCs in a statistical method that can diagnose and isolate failure modes, especially ambiguous failure modes (i.e., failure modes having a common DTC signature pattern); 2) diagnose intermittent faults by also modeling when the system does not have any DTCs; and 3) predict the remaining time to next failure state (RTFS) with acceptable confidence limits of a failure mode.

SUMMARY

In accordance with the teachings of the present invention, a system and method for fault diagnosis includes receiving information defining a relationship between failure modes and diagnostic trouble codes and extracting diagnostic trouble code data, including set times, frequency data and diagnostic trouble code sequence information for a plurality of diagnostic trouble codes relating to a plurality of failure modes. The system and method further include constructing a Markov chain using the diagnostic trouble code data for each of the plurality of failure modes, training the Markov chain to learn a set of state parameters using the diagnostic trouble code data, and computing a likelihood of a diagnostic trouble code sequence for each of the plurality of failure modes using the trained Markov chains.

Additional features of the present invention will become apparent from the following description and appended claims, taken in conjunction with the accompanying drawings.

BRIEF DESCRIPTION OF THE DRAWINGS

FIG. 2 illustrates an exemplary diagnostic matrix;

DETAILED DESCRIPTION OF THE EMBODIMENTS

The following discussion of the embodiments of the invention directed to fault diagnosis and prognosis using time-stamped diagnostic trouble codes (DTCs) and Markov chains is merely exemplary in nature, and is in no way intended to limit the invention or its applications or uses.

Figure 1:
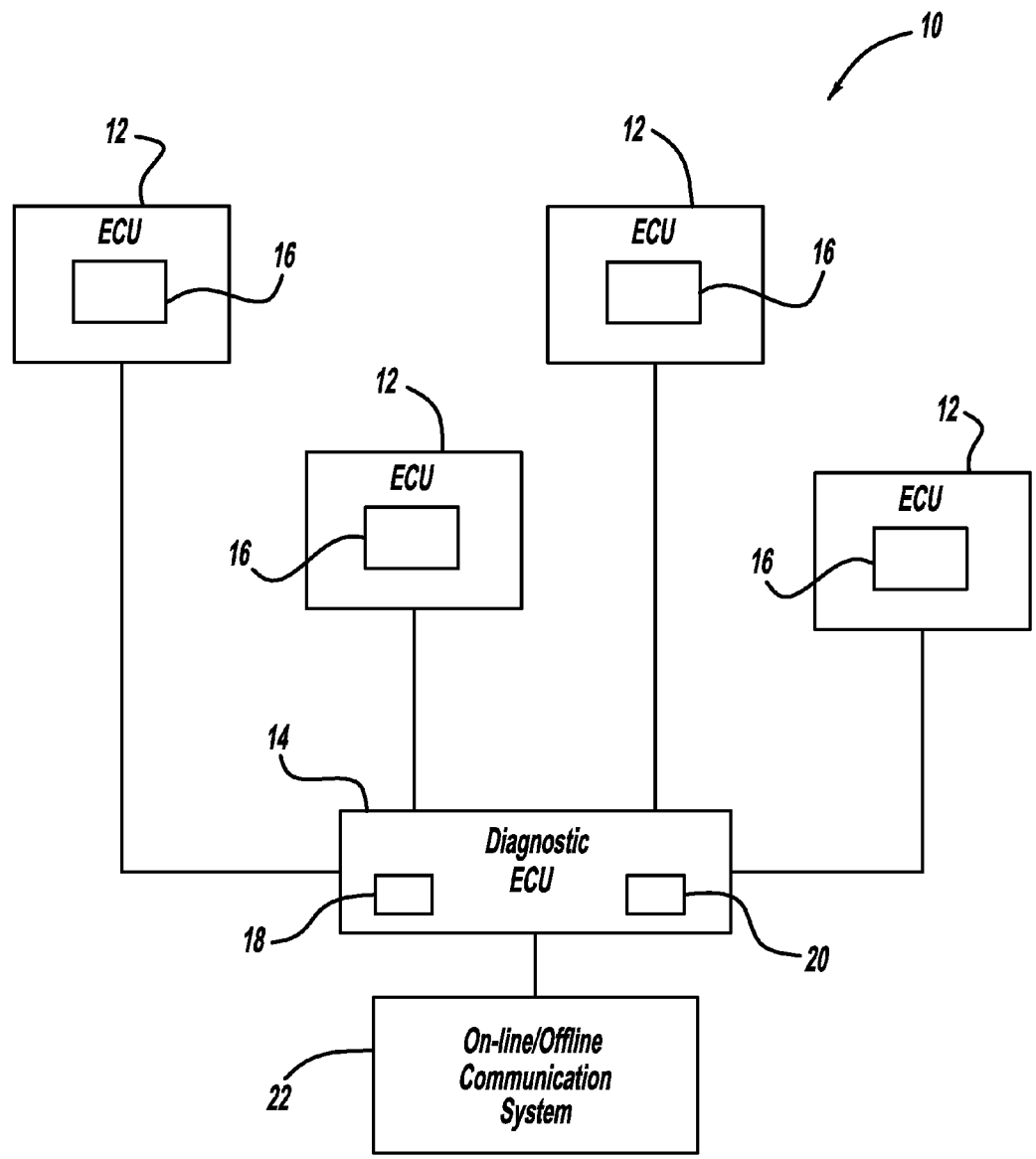
FIG. 1 illustrates an exemplary fault diagnosis and prognosis system, according to one embodiment.

FIG. 1 illustrates an exemplary fault diagnosis and prognosis system 10 having a plurality of electronic control units (ECUs) 12 in communication with a central diagnostic ECU 14. Each ECU 12 is configured to receive diagnostic trouble codes (DTCs) from various sensors and components within a vehicle (not shown). A DTC is essentially a fault code indicating that a vehicle operating parameter, or set of parameters, has exceeded a predetermined threshold or has failed some diagnostic test associated with a DTC. In some embodiments, a DTC may also be referred to as a symptom. DTCs received by the ECU 12 are generally stored in an ECU memory module 16 located within each ECU 12. In this embodiment, each ECU 12 is configured to transmit DTCs to the central diagnostic ECU 14, which includes an algorithm 20 for determining and predicting failure modes.

In one embodiment, the diagnostic ECU 14 is configured to communicate directly with an on-board flexible compute platform 22, such as OnStar™. In addition, or alternatively, the system may be configured to communicate with an off-line communication platform where the diagnostic ECU 14 is connected to an external interface, such as a Tech II™ or a Multiple Diagnostic Interface (MDI™). One of ordinary skill understands that the system shown in FIG. 1 is merely exemplary and that other system configurations are equally applicable to the diagnosis and prognosis system and method contained herein. For example, an alternative system may be configured such that there is no central diagnostic ECU 14. Instead, each ECU 12 may include algorithm 20 and communicate individually with one another and/or the on-line/off-line communication platforms 22.

Algorithm 20 can be expressed in two phases, a data collection and training phase, and a testing phase. In the data collection and training phase, algorithm 20 gathers data and constructs a Markov chain using the collection of data. The collection of data includes, but is not limited to, field failure data and historical data, which includes a set time (i.e., the time at which the DTC was triggered), frequency for each DTC, and DTC sequence information. By knowing the time at which each DTC occurred and the frequency of occurrence, algorithm 20 is able to determine parameters, such as initial and transition probabilities, for each state of the Markov chain. The initial probability of each state indicates the prior knowledge about being in that state at the beginning (i.e. t=0). These probabilities may be obtained using historical field failure data or from domain knowledge. Using the approach disclosed herein, the initial probability of the "no DTC" state will be highest among all other states. The transition probabilities indicate the probability of moving from one state to another state. A complete description of the DTC Markov chain will be discussed below.

The collection of data may also include information relating to a relationship between the failure modes and each DTC. This relationship often is expressed using a table or matrix that can be generated and stored by the central diagnostic ECU 14, any of the individual ECUs 12, or by any other computing device. An exemplary diagnostic matrix 24 illustrating the relationship between failure modes (FMs) 1-12 and DTCs 1-13 is shown in FIG. 2. Failure modes can have one or more overlapping DTC, or they may have a common DTC signature pattern where the DTCs are the same for more than one failure mode. For example, the diagnostic matrix 24 of FIG. 2 shows that failure modes 1 and 2 ($FM_1$ and $FM_2$, respectively) have the same DTC signature pattern, namely, $DTC_1$ and $DTC_2$. When DTCs have the same signature pattern they are considered part of an ambiguity group because the failure mode is not distinguishable based on their DTC pattern alone.

Figure 3:
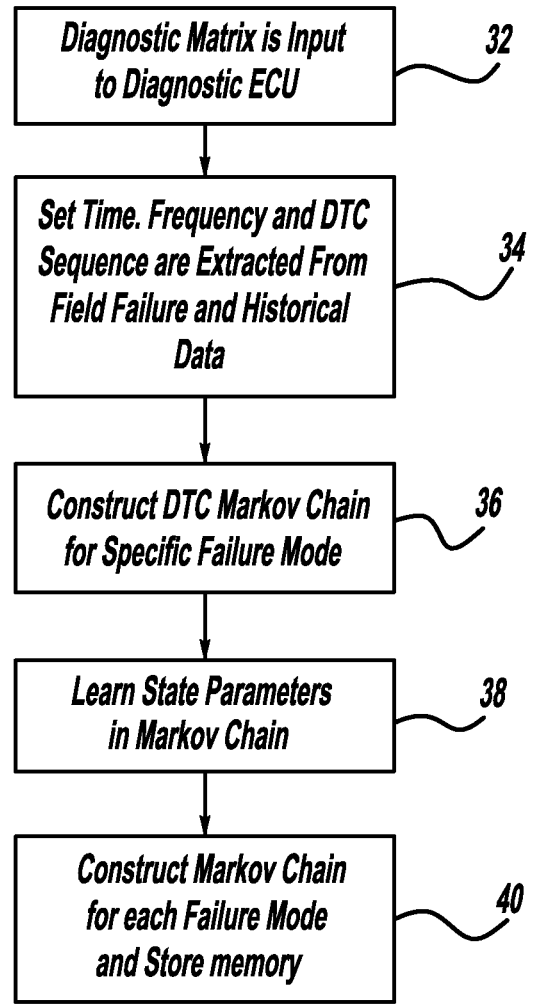
FIG. 3 is a flow chart illustrating an exemplary data collection and training phase of the fault diagnosis and prognosis algorithm.
Figure 4:
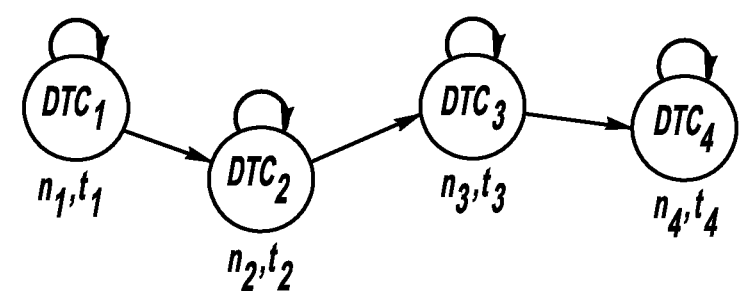
FIG. 4 illustrates an exemplary DTC sequence.

FIG. 3 is a flow chart illustrating an exemplary data collection and training phase 30 of algorithm 20. At step 32, diagnostic matrix 24 is input to a computing device implementing algorithm 20, which in this example, is central diagnostic ECU 14. Algorithm 20 considers only the failure modes that are part of an ambiguity group. At step 34 the set time, frequency and DTC sequence information relating to a specific failure mode are extracted from the field failure and historical data. An exemplary DTC sequence is illustrated in FIG. 4. A DTC Markov chain is constructed at step 36 for the specific failure mode by making "no DTC" and "DTCs" as states of the Markov chain. A "no DTC" state represents a no error condition or time lapse between DTC occurrences and enables determination of intermittent failures. At step 38, algorithm 20 trains the Markov chain to learn the state parameters, i.e., initial and transition probabilities, using the DTC set times and frequency data. DTC Markov chains are constructed for each failure mode and stored at step 40 in central diagnostic ECU 14 memory 18.

Figure 5A:
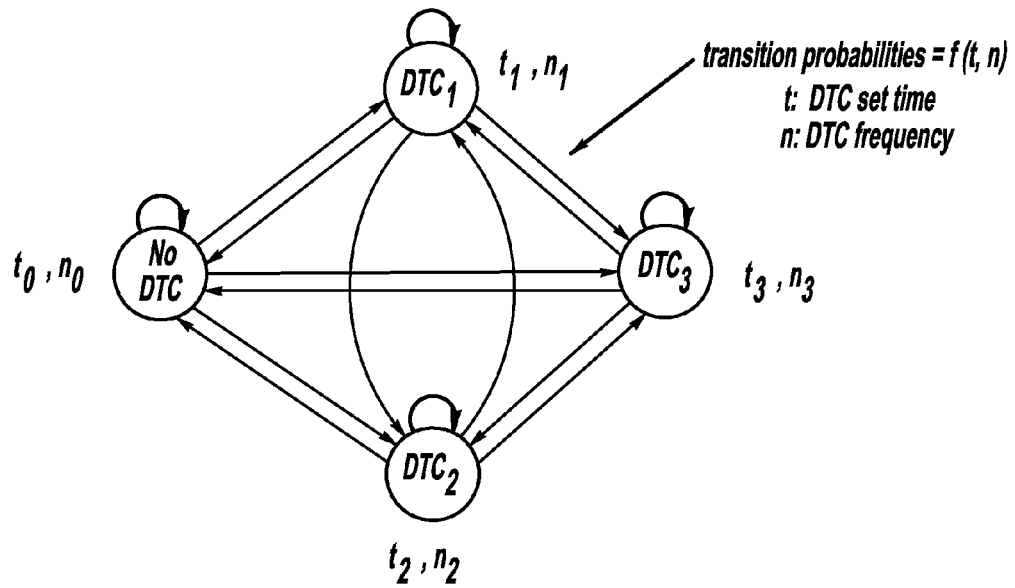
FIGS. 5a and 5b illustrate exemplary DTC Markov chains for a specific failure mode.
Figure 5B:

FIG. 5a illustrates an exemplary DTC Markov chain 42 for a specific failure mode having four states, DTC, $DTC_2$, $DTC_3$ and No DTC. For each DTC state, $t_N$ represents the DTC set time and $n_N$ represents the DTC frequency. The transition probabilities generated for each state are a function of the DTC set time $t_N$ and frequency $n_N$. FIG. 5b illustrates another example of an exemplary DTC Markov chain 43 where 0.98 and 0.7 represent self transition probabilities and 0.02 and 0.3 represent transition probabilities to other states.

Figure 6:
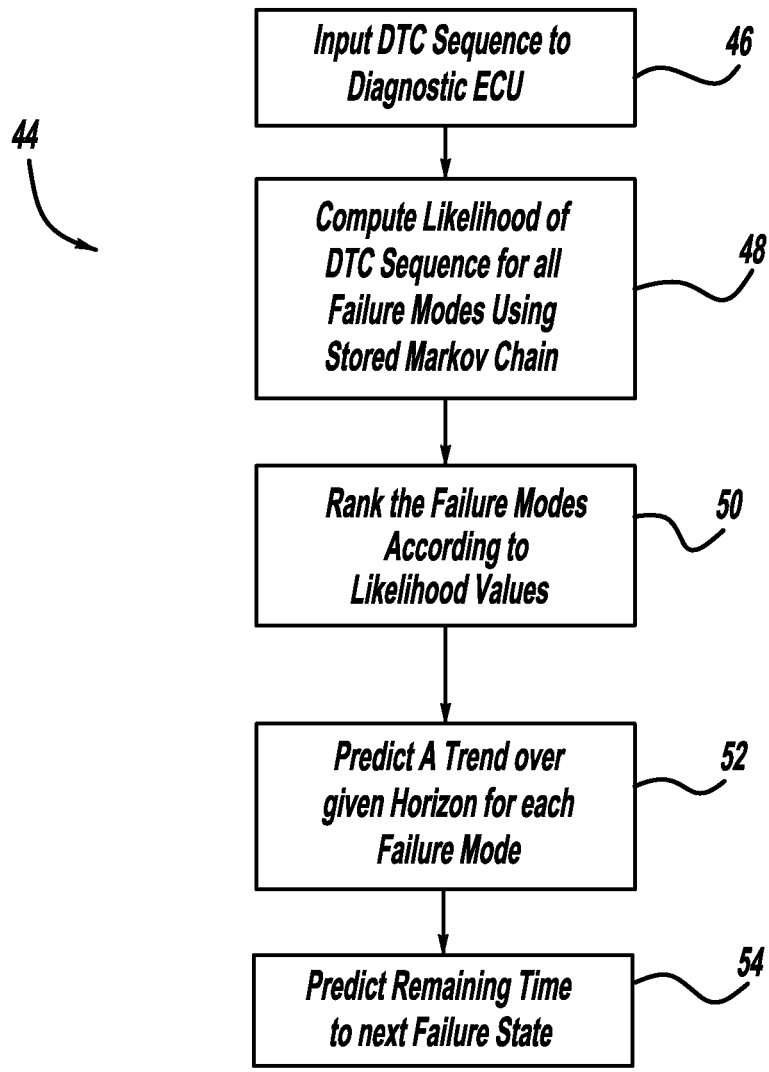
FIG. 6 is a flow chart illustrating an exemplary testing phase of the fault diagnosis and prognosis algorithm.
Figure 7:
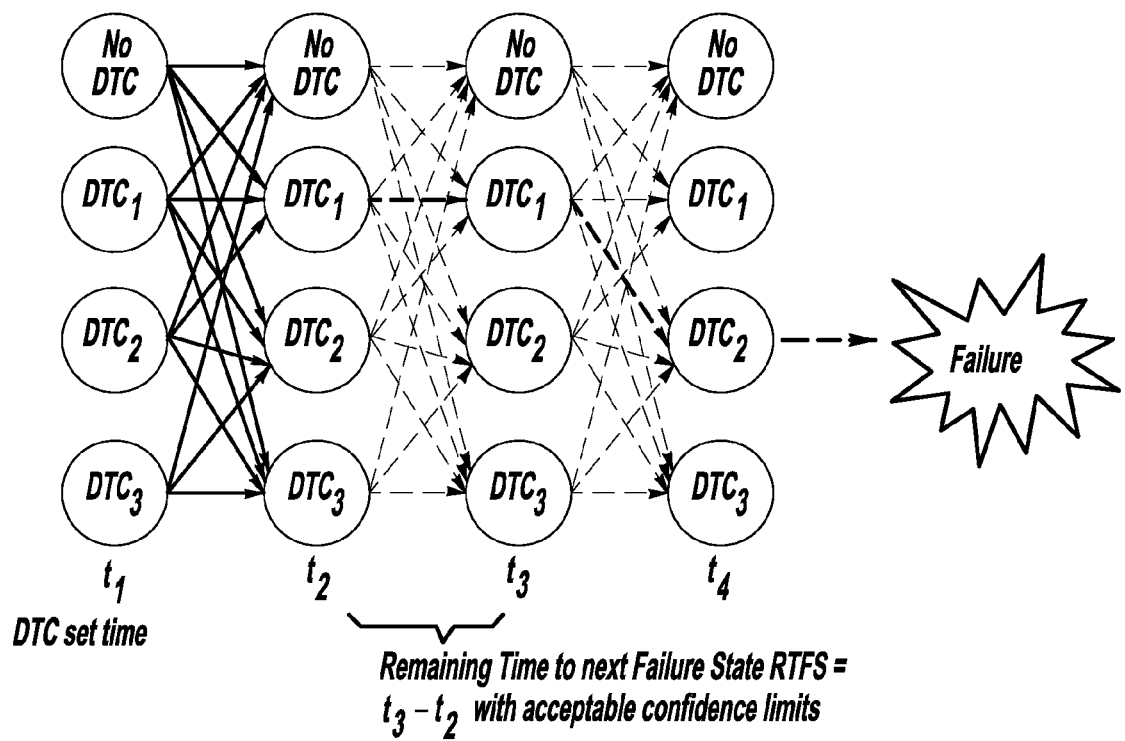
FIG. 7 illustrates how a remaining time to next failure state (RTFS) is predicted.

FIG. 6 is a flow chart illustrating an exemplary testing phase 44 of algorithm 20. At step 46, the DTC sequence for the test data is input to central diagnostic ECU 14. The likelihood of the DTC sequence for all failure modes is computed at step 48 using the stored Markov chains. At step 50, a fault diagnosis is performed by ranking the likelihoods for each failure mode in order of most likely to fail. A trend is predicted at step 52 over a given prediction horizon for each Markov chain. Using one approach, the prediction is computed for each failure mode using the Viterbi algorithm, which is a known algorithm for computing the probability of a sequence of observed events. Referring to FIG. 7, the remaining time to next failure state (RTFS) with acceptable confidence limits is predicted at step 54 using dynamic programming.

System 10, including ECUs 12, diagnostic ECU 14 and online/offline communication system 22 may be implemented on one or more suitable computing devices, which generally include applications that may be software applications tangibly embodied as a set of computer-executable instructions on a computer readable medium within the computing device. The computing device may be any one of a number of computing devices, such as a personal computer, processor, handheld computing device, etc.

Computing devices generally each include instructions executable by one or more devices such as those listed above. Computer-executable instructions may be compiled or interpreted from computer programs created using a variety of programming languages and/or technologies, including without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable media includes any medium that participates in providing data (e.g., instructions), which may be read by a computing device such as a computer. Such a medium may take many forms, including, but not limited to, non-volatile media, volatile media, and transmission media. Non-volatile media includes, for example, optical or magnetic disks and other persistent memory. Volatile media include dynamic random access memory (DRAM), which typically constitutes a main memory. Common forms of computer-readable media include any medium from which a computer can read.

It is to be understood that the above description is intended to be illustrative and not restrictive. Many alternative approaches or applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that further developments will occur in the arts discussed herein, and that the disclosed systems and methods will be incorporated into such further examples. In sum, it should be understood that the invention is capable of modification and variation and is limited only by the following claims.

The present embodiments have been particular shown and described, which are merely illustrative of the best modes. It should be understood by those skilled in the art that various alternatives to the embodiments described herein may be employed in practicing the claims without departing from the spirit and scope of the invention and that the method and system within the scope of these claims and their equivalents be covered thereby. This description should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

All terms used in the claims are intended to be given their broadest reasonable construction and their ordinary meaning as understood by those skilled in the art unless an explicit indication to the contrary is made herein. In particular, use of the singular articles such as "a", "the", "said", etc. should be read to recite one or more of the indicated elements unless a claim recites an explicit limitation to the contrary.

What is claimed is:

1. A fault diagnosis and prognosis system, comprising:
a plurality of electronic control units, wherein at least one of the plurality of electronic control units is configured to:
receive information defining a relationship between failure modes and diagnostic trouble codes;
extract diagnostic trouble code data for a plurality of diagnostic trouble codes relating to a particular failure mode;
construct a Markov chain using the diagnostic trouble code data for the particular failure mode;
train the Markov chain to learn a set of state parameters using the diagnostic trouble code data;
compute a likelihood of a diagnostic trouble code sequence for the particular failure mode using the trained Markov chain; and
predict a trend using the trained Markov chain.

2. The system of claim 1, wherein the diagnostic trouble code data includes set times, frequency data and diagnostic trouble code sequence information.

3. The system of claim 1, wherein the diagnostic trouble code data is extracted from field failure data and historical data.

4. The system of claim 1, wherein the particular failure mode is selected from an ambiguity group containing a plurality of failure modes.

5. The system of claim 4, wherein a Markov chain is constructed for each of the plurality of failure modes in the ambiguity group.

6. The system of claim 5, wherein a likelihood of a diagnostic trouble code sequence is computed for each of the plurality of failure modes in the ambiguity group.

7. The system of claim 6, wherein the likelihood for each of the plurality of failure modes is ranked in order of most likely to fail.

8. The system of claim 1, further including predicting a remaining time to next failure state using the trained Markov chain.

9. The system of claim 1, wherein the set of state parameters includes initial and transition probabilities for each state of the Markov chain.

10. The system of claim 1, wherein the at least one of the plurality of electronic control units is a central diagnostic electronic control unit.

11. The system of claim 1, wherein the information defining a relationship between failure modes and diagnostic trouble codes is in the form of a diagnostic matrix.

12. The system of claim 1, wherein each of the diagnostic trouble codes represent a state of the Markov chain.

13. The system of claim 12, wherein the Markov chain is constructed to include a no diagnostic trouble code state to diagnosis intermittent failures.

14. A method for fault diagnosis, comprising:
receiving information defining a relationship between failure modes and diagnostic trouble codes;
extracting diagnostic trouble code data, including set times, frequency data and diagnostic trouble code sequence information for a plurality of diagnostic trouble codes relating to a plurality of failure modes;
constructing a set of Markov chains using the diagnostic trouble code data for each of the plurality of failure modes;
training the set of Markov chains to learn a set of state parameters using the diagnostic trouble code data; and
computing a likelihood of a diagnostic trouble code sequence for each of the plurality of failure modes using the trained set of Markov chains.

15. The method of claim 14, further including predicting a trend over a given horizon using a trained Markov chain from the set of Markov chains.

16. The method of claim 14, further including determining a fault diagnosis by ranking a likelihood for each of the plurality of failure modes in order of most likely to fail.

17. The method of claim 16, further including communicating the fault diagnosis to an on-line communication system.

18. The method of claim 16, further including communicating the fault diagnosis to an off-line communication system.

19. A computer-readable non-transitory medium tangibly embodying computer-executable instructions for:
receiving a diagnostic matrix defining a relationship between failure modes and diagnostic trouble codes;
extracting diagnostic trouble code data, including set times, frequency data and diagnostic trouble code sequence information for a plurality of diagnostic trouble codes relating to a plurality of failure modes;
constructing a set of Markov chains using the diagnostic trouble code data for each of the plurality of failure modes, wherein each of the diagnostic trouble codes represent a state of a Markov chain from the set of Markov chains;
training the set of Markov chains to learn a set of state parameters using the diagnostic trouble code data, wherein the set of state parameters includes initial and transition probabilities for each state of the Markov chain from the set of Markov chains;
computing a likelihood of a diagnostic trouble code sequence for each of the plurality of failure modes using the trained set of Markov chains;
determining a fault diagnosis by ranking a likelihood for each of the plurality of failure modes in order of most likely to fail; and
predicting a remaining time to next failure state using the trained Markov chain.

20. The system of claim 19, wherein a Markov chain from the set of Markov chains is constructed to include a no diagnostic trouble code state to diagnosis intermittent failures.

* * * * *